(12) United States Patent
Yamaguchi et al.

(10) Patent No.: US 9,962,997 B2
(45) Date of Patent: May 8, 2018

(54) HEAVY DUTY PNEUMATIC TIRE

(71) Applicant: The Yokohama Rubber Co., LTD., Minato-ku, Tokyo (JP)

(72) Inventors: Yukihito Yamaguchi, Hiratsuka (JP); Shoei Kakuta, Hiratsuka (JP); Hideki Hamanaka, Hiratsuka (JP); Risa Tauchi, Hiratsuka (JP); Toshiyuki Sato, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 0 days. days.

(21) Appl. No.: 15/328,466

(22) PCT Filed: Jul. 23, 2015

(86) PCT No.: PCT/JP2015/070932
§ 371 (c)(1),
(2) Date: Jan. 23, 2017

(87) PCT Pub. No.: WO2016/013602
PCT Pub. Date: Jan. 28, 2016

(65) Prior Publication Data
US 2017/0210181 A1   Jul. 27, 2017

(30) Foreign Application Priority Data

Jul. 23, 2014  (JP) .................................. 2014-149823
May 13, 2015  (WO) .................. PCT/JP2015/063719

(51) Int. Cl.
*B60C 11/11* (2006.01)
*B60C 11/03* (2006.01)
*B60C 11/13* (2006.01)

(52) U.S. Cl.
CPC ............... *B60C 11/13* (2013.01); *B60C 11/11* (2013.01); *B60C 2011/0346* (2013.01);
(Continued)

(58) Field of Classification Search
CPC ......... B60C 11/0311; B60C 2011/0348; B60C 2011/0353; B60C 2200/065; B60C 2011/0351; B60C 2011/0346
See application file for complete search history.

(56) References Cited

U.S. PATENT DOCUMENTS

D457,128 S  *  5/2002  Robert ......................... D12/579
2007/0199633 A1 *  8/2007  Hayashi .............. B60C 11/0311
                                                                152/209.18

(Continued)

FOREIGN PATENT DOCUMENTS

JP   H09-136514   5/1997
JP   2004-098914   4/2004

(Continued)

OTHER PUBLICATIONS

Machine Translation: JP-2008114738-A; Yoda, Hidetoshi; no date.*

(Continued)

*Primary Examiner* — Michael H. Wilson
*Assistant Examiner* — Kendra Ly
(74) *Attorney, Agent, or Firm* — Thorpe North & Western

(57) ABSTRACT

A pneumatic tire having a tread pattern includes: shoulder lug grooves opening at ground contact edges; center lug grooves having both ends; circumferential primary grooves being formed to wave-like shape and alternately connecting the ends of the center lug grooves and inward ends of the shoulder lug grooves in the tire width direction; center blocks formed in a row defined by the center lug grooves and the pair of circumferential primary grooves; and circumferential secondary grooves being formed in regions of the center blocks and interconnecting center lug grooves adjacent in the tire circumferential direction. The circumferential secondary grooves have secondary groove turning portions, and the center lug grooves have lug groove turning portions (Continued)

and connect to the circumferential secondary grooves at the lug groove turning portions.

15 Claims, 6 Drawing Sheets

(52) U.S. Cl.
CPC .......... *B60C 2011/0348* (2013.01); *B60C 2011/0351* (2013.01); *B60C 2011/0358* (2013.01); *B60C 2200/065* (2013.01)

(56) References Cited

U.S. PATENT DOCUMENTS

| | | | |
|---|---|---|---|
| 2008/0078488 A1 | 4/2008 | Yoda | |
| 2009/0032157 A1* | 2/2009 | Inoue | B60C 11/0311 152/209.8 |

FOREIGN PATENT DOCUMENTS

| | | | | | |
|---|---|---|---|---|---|
| JP | 2004-224131 | | 8/2004 | | |
| JP | 2006-151083 | | 6/2006 | | |
| JP | 2008-279976 | | 5/2007 | | |
| JP | 2007-191093 | | 8/2007 | | |
| JP | 2008-114738 | | 5/2008 | | |
| JP | 2008114738 A | * | 5/2008 | ............. | B60C 11/01 |
| JP | 2008279976 A | * | 11/2008 | .......... | B60C 11/0311 |
| JP | 2010-125999 | | 6/2010 | | |
| WO | WO 2006/001202 | | 1/2006 | | |
| WO | WO 2006/057169 | | 6/2006 | | |
| WO | WO 2007/018009 | | 2/2007 | | |
| WO | WO 2008/056504 | | 5/2008 | | |

OTHER PUBLICATIONS

Machine Translation: JP-2008279976-A; Kawai, Toshiyuki; no date.*
International Search Report for International Application No. PCT/JP2015/070932 dated Aug. 25, 2015, 4 pages, Japan.

* cited by examiner

HEAVY DUTY PNEUMATIC TIRE

TECHNICAL FIELD

The present technology relates to a heavy duty pneumatic tire having a tread pattern.

BACKGROUND ART

Various performance improvements are required of current pneumatic tires, and tires are equipped with tread patterns in order to achieve these performance enhancements. In a case of a heavy duty tire, tread patterns are provided in such a way as to achieve enhanced traction performance.

For example, a heavy duty pneumatic tire designed to achieve good traction characteristics while running on rough roads and wet performance during high-speed traveling in a compatible manner, until the terminal stage of wear is known (see Japanese Unexamined Patent Application Publication No. H09-136514A). In the heavy duty pneumatic tire, the pneumatic tire is equipped with at least one circumferential groove that extends in a circumferential direction, and a plurality of lateral grooves that connect in the circumferential direction, and are disposed spaced apart in the circumferential direction to either side of the circumferential groove, wherein
  (1) the circumferential groove extends in the circumferential direction in a tread central region that corresponds to 50% of the tread width;
  (2) a depth of the circumferential groove is 5% of the tread width or greater; and
  (3) a depth of at least lateral grooves disposed in both side sections of the tread among the lateral grooves is 109% of the depth of the circumferential groove or greater.

It is asserted that, in this manner, good traction characteristics while running on rough roads and wet performance during high-speed traveling can be achieved and enhanced in a compatible manner.

With the heavy duty pneumatic tire described above, while the traction characteristics in the terminal stage of wear can be enhanced, heel and toe wear is prone to occur in the tread center region, prior to reaching the terminal stage of wear. Heel and toe wear is one type of abnormal wear, in which the amount of wear in edge portions of the blocks located on both sides of the tire circumferential direction of the lug grooves differ to either side of the lug groove, forming unevenness.

SUMMARY

Particularly with tires for buses, trucks, and the like, or with large tires, for example, 49-inch or greater, which are mounted on dump trucks used in mines and the like, it is preferable from the standpoint of effective use of the tire to suppress heel and toe wear, while enhancing the traction performance.

The present technology provides a pneumatic tire with a tread pattern, in which heel and toe wear can be suppressed in a heavy duty pneumatic tire.

A first aspect of the present technology is a pneumatic tire provided with a tread pattern.

The tread pattern includes:
  a plurality of center lug grooves spaced apart in a tire circumferential direction, the plurality of center lug grooves having two ends and extending in half-tread regions on a first side and a second side in a tire width direction with reference to a tire equator line to cross the tire equator;
  a plurality of shoulder lug grooves spaced apart in the tire circumferential direction, extending outward in the tire width direction in each of the half-tread regions, having ends outward in the tire width direction opening at ground contact edges disposed on either side in the tire width direction, the plurality of shoulder lug grooves being configured so that, in the tire circumferential direction, one shoulder lug groove of the plurality of shoulder lug grooves is provided in between the ends of adjacent center lug grooves, among the center lug grooves, adjacent in the tire circumferential direction;
  a pair of circumferential primary grooves disposed in the half-tread regions and formed, in each of the half-tread regions, to extend around an entire circumference of the tire in a wave-like shape with a groove width less than that of the plurality of shoulder lug grooves, in such a way as to alternately connect the ends of the center lug grooves and inwards ends of the of the shoulder lug grooves in the tire width direction;
  a plurality of center blocks defined by the plurality of center lug grooves and the pair of circumferential primary grooves and formed in a row in the tire circumferential direction, and
  circumferential secondary grooves formed in regions of the center blocks, interconnecting center lug grooves, among the center lug grooves, adjacent in the tire circumferential direction.

Each of the center lug grooves has at least one lug groove turning portion with a bent or curved shape,
  each of the circumferential secondary grooves has at least one secondary groove turning portion with a bent or curved shape, and connecting to the center lug grooves at the lug groove turning portion, and
  a ratio D3/LB of a maximum groove depth D3 of the center lug grooves to a maximum width LB of the center blocks in the tire circumferential direction is from 0.1 to 0.3.

In a preferred practice, the lug groove turning portion includes a first groove turning portion on the first side, the first groove turning portion bending or curving so as to protrude towards a third side in the tire circumferential direction, and a second groove turning portion on the second side, the second groove turning portion curving or bending so as to protrude towards a fourth side that is the opposite side to the third side in the tire circumferential direction,
  a first connection end portion on the first side and a second connection end portion on the second side where the center lug grooves each connects to the circumferential primary groove, connects to the inwards end of the circumferential primary groove in the tire width direction, and the second connection end portion of each of the center lug grooves is located on the third side in the tire circumferential direction in relation to the first connection end, and
  in relation to a center position in the groove width direction of the center lug grooves, an inclination angle, with respect to the tire width direction, of a first straight line connecting between the first connection end and the protruding end at which the first groove turning portion protrudes towards the third side in the tire circumferential direction, and an inclination angle, with respect to the tire width direction, of a second straight line connecting between the second connection end portion and a protruding end at which the second groove turning portion protrudes towards the fourth side in the tire circumferential direction, are greater than an inclination angle, with respect to the tire width direction, of a third straight line connecting between the first connection end and the second connection end portion of each of the center lug grooves.

In a preferred practice, in relation to the center position in the groove width direction of the center lug grooves, a portion of each of the center lug grooves disposed between the first connection end and the protruding end where the first groove turning portion protrudes to the third side in the tire circumferential direction is located on the first straight line or towards the third side in relation to the first straight line, and a portion of each of the center lug grooves disposed between the second connection end and the protruding end where the second groove turning portion protrudes to the fourth side in the tire circumferential direction is located on the second straight line or towards the fourth side in relation to the second straight line.

In a preferred practice, each of the pair of circumferential primary grooves is provided with a raised bottom portion in which the groove depth is partially shallow.

In a preferred practice, a ratio D2/T of a groove depth D2 in the raised bottom portion with respect to the tread width T of a tread portion in the tire width direction is less than 0.05.

In preferred practice, a ratio D1/T of a maximum groove depth D1 of the circumferential primary grooves with respect to the tread width T of a tread portion in the tire width direction is from 0.03 to 0.09.

In a preferred practice, the secondary groove turning portions are provided with a third groove turning portion and a fourth groove turning portion, linking groove portions linking between either one of the positions of the third groove turning portion and the fourth groove turning portion, and a connecting portion between the circumferential secondary groove and one of the center lug grooves, and an inclination angle of the linking groove portions with respect to the tire circumferential direction is from 0 to 5 degrees.

In a preferred practice, a maximum groove depth D5 of the linking groove portions is shallower compared with the maximum groove depth D3 of the center lug grooves. In this instance, in a preferred practice, a ratio D5/D3 of the maximum groove depth D5 to the maximum groove depth D3 is from 0.3 to 0.75.

In a preferred practice, an intermediate groove portions that join positions of the third groove turning portion and the fourth groove turning portion cross the tire equator line.

In a preferred practice, a maximum groove width P6 of the intermediate groove portions is equal to a maximum groove width P5 of the linking groove portions, or greater than the maximum groove width P5. In this instance, in a preferred practice, a ratio P6/P5 of the maximum groove width P6 to the maximum groove width P5 is from 1 to 2.5.

In a preferred practice, two start positions in the tire width direction of each of the circumferential secondary grooves extending respectively from the center lug grooves are mutually shifted in position. In this instance, in a preferred practice, the two start positions in the tire width direction are located on mutually different sides in the tire width direction, with reference to the tire equator line.

In a preferred practice, the center blocks have corners formed in corresponding to primary groove turning portions that turn in convex shapes protruding outward in the tire width direction in the wave-like shaped circumferential primary grooves, and the corners have obtuse angles.

In a preferred practice, the groove widths of the pair of circumferential primary grooves and the center lug grooves are all from 7 to 20 mm.

In a preferred practice, the heavy duty pneumatic tire is mounted on a construction vehicle or an industrial vehicle.

According to the heavy duty pneumatic tire described above, heel and toe wear can be suppressed without diminishing the traction performance.

DETAILED DESCRIPTION

A detailed description will be given below of a configuration of a pneumatic tire of the present technology with reference to the drawings.

"Tire width direction" used herein refers to the direction of the central axis of rotation of the pneumatic tire. "Tire circumferential direction" refers to a direction in which the rotating surface of the tread surface rotates, the rotating surface being formed when a tire 1 rotates about the central axis of rotation of the tire. "Tire radial direction" refers to a direction extending radially out from the central axis of rotation of the tire. "Outward in the tire radial direction" refers to the direction away from the central axis of rotation of the tire. "Inward in the tire radial direction" refers to the direction toward the central axis of rotation of the tire. "Outward in the tire width direction" refers to the direction away from the tire equator line in the tire width direction. "Inward in the tire width direction" refers to the direction toward the tire equator line in the tire width direction.

In the present specification, a heavy duty tire used herein include tires specified according to Chapter C of the Yearbook 2014 of the Japan Automobile Tyre Manufacturers Association Inc (JATMA), as well as tires for type 1 vehicles (dumptrucks, scrapers), tires for type 2 vehicles (graders), tires for type 3 vehicles (shovel loaders and the like), tires for type 4 vehicles (tire rollers), tires for moving cranes (truck cranes, wheel cranes) which are specified in Chapter D, and vehicle tires specified in section 4 or section 6 of the TRA 2013 Yearbook.

Figure 1:
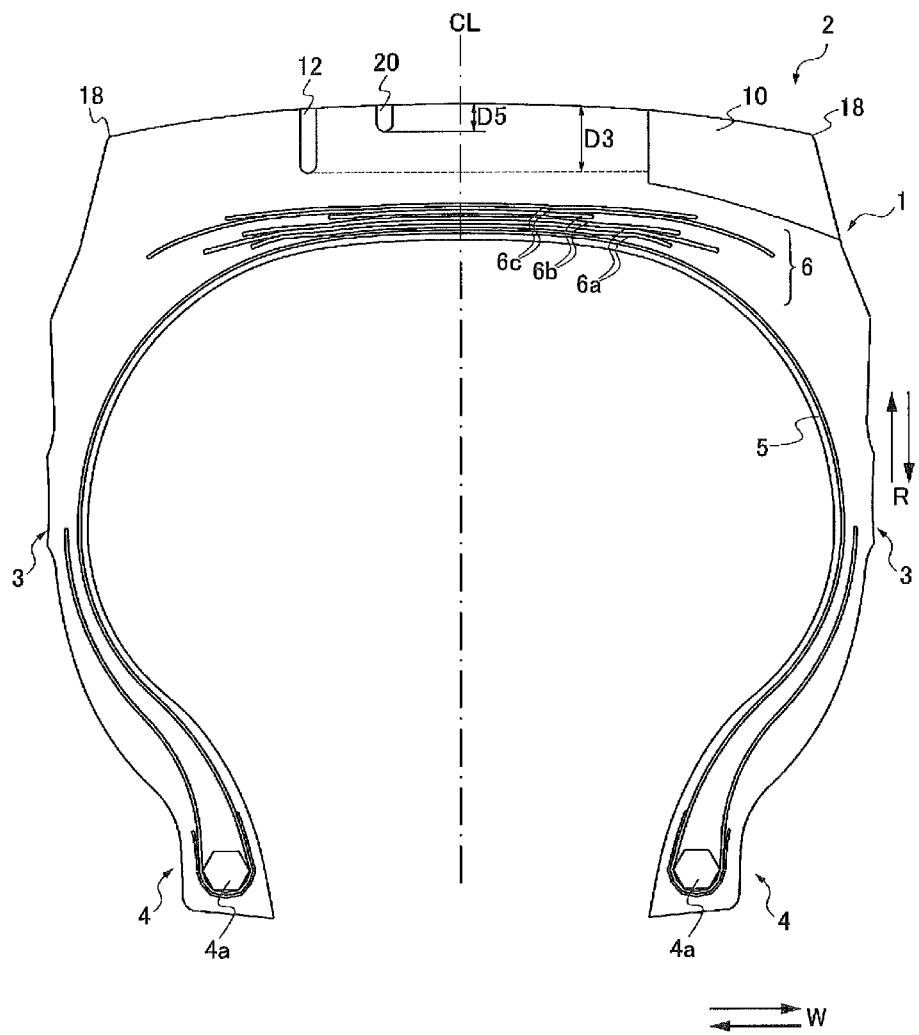
FIG. 1 is a cross-sectional view of a pneumatic tire of a first embodiment of the present embodiment.

FIG. 1 is a tire cross-sectional view illustrating a cross section of a pneumatic tire (hereinafter referred to as "tire") of the present embodiment. FIG. 1 is a cross-sectional view taken along line X-X' in FIG. 2 (described later), cutting along a plane that passes through the tire rotation axis. In FIG. 1, the tire radial direction is denoted by R (two arrows pointing towards different sides), and the tire width direction is denoted by W (two arrows pointing towards different sides).

In FIG. 1, a pneumatic tire 1 has a tread portion 2, sidewall portions 3, and bead portions 4. The bead portions 4 on opposite sides in the tire width direction each include a bead core 4a. A carcass layer 5 is laid between the pair of bead cores 4a. The carcass layer 5 is turned up at both end portions at the bead cores 4a from inward to outward of the tire. The carcass layer 5 may be configured of a single carcass ply, or configured of multiple carcass plies.

Belt layers 6 are disposed on an outer periphery side of the carcass layer 5 in the tread portion 2. The belt layer 6 is provided with a first cross belt layer 6a, a second cross belt layer 6b, and a third cross belt layer 6c, in that order from inward to outward in the tire radial direction. The first cross belt layer 6a, the second cross belt layer 6b, and the third cross belt layer 6c are each configured of two belts. In each of the pairs of belts that make up the first cross belt layer 6a, the second cross belt layer 6b, and the third cross belt layer 6c, reinforcing cords are inclined towards mutually different sides with respect to the tire circumferential direction. The belt layer 6 illustrated in FIG. 1 has a configuration in which of the two belts of the first cross belt layer 6a, the belt located inward in the tire radial direction has a narrower belt width in the tire width direction, as compared with the belt located outward in the tire radial direction. Of the two belts of the second cross belt layer 6b, the belt located inward in the tire radial direction has a wider belt width in the tire width direction, as compared with the belt located outward in the tire radial direction. Of the two belts of the third cross belt layer 6c, the belt located inward in the tire radial direction has a wider belt width in the tire width direction, as compared with the belt located outward in the tire radial direction. The belt width is not particular limited, and the belt width configuration illustrated in FIG. 1 is simply an example. The belt layer 6 is configured of three cross belt layers, but may be configured of two cross belt layers, and the configuration of the belt is not particularly limited. Sheet-like rubber layers may be provided in portions between the belt layers of the second cross belt layer 6b.

It is preferred that of the reinforcing cords of the belts of the first cross belt layer 6a, the belt cord having the smallest angle with respect to the tire circumferential direction has an inclination angle with respect to the tire circumferential direction of from 20 to 24 degrees, from the view point that "hoop effect" can be effectively achieved by which deformation of the tire distending in the tire radial direction is suppressed by the belts. It is preferred that of the reinforcing cords of the belts of the second cross belt layer 6b, the belt cord having the smallest angle with respect to the tire circumferential direction has an inclination angle with respect to the tire circumferential direction of from 16 to 20 degrees, from the view point that the "hoop effect" can be effectively achieved. In a preferred practice, of the reinforcing cords of the belts of the third cross belt layer 6c, the belt cord having the smallest angle with respect to the tire circumferential direction has an inclination angle with respect to the tire circumferential direction of from 22 to 26 degrees. In a preferred practice, the aforementioned inclination angles of the reinforcing cords of the belts of the first cross belt layer 6a are greater than the aforementioned inclination angles of the reinforcing cords of the belts of the second cross belt layer 6b.

Such a configuration is but one possible example of the tire 1, and other known configuration may be employed.

Tread Pattern

Figure 2:
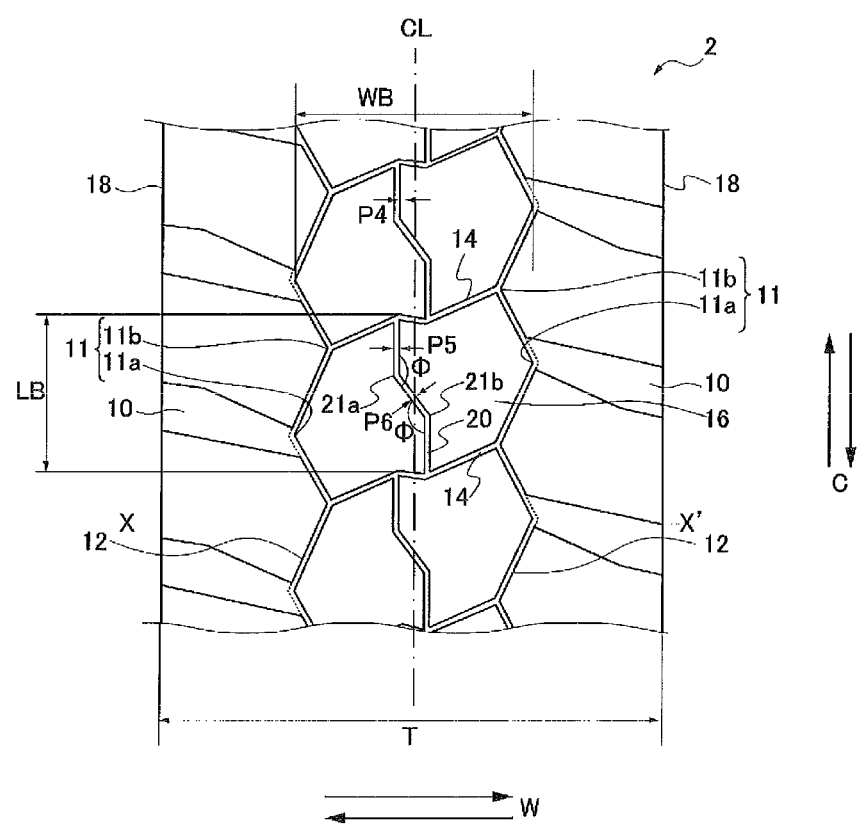
FIG. 2 is a pattern diagram illustrating a portion of a tread pattern of a tread portion of the pneumatic tire of the present embodiment in a plan view.

FIG. 2 is a pattern diagram illustrating the tread pattern of the tread portion 2 of the tire 1 in a plan view. In FIG. 2, the tire circumferential direction is denoted by C, and the tire width direction is denoted by W.

The tread portion 2 is provided with a tread pattern that includes shoulder lug grooves 10, a pair of circumferential primary grooves 12, center lug grooves 14, center blocks 16, and circumferential secondary grooves 20.

A plurality of the shoulder lug grooves 10 are disposed spaced apart in the tire circumferential direction, in each of the half-tread regions disposed on either side in the tire width direction with reference to the tire equator line CL. The shoulder lug grooves 10 extend outward in the tire width direction in each of the half-tread regions disposed on either side in the tire width direction with reference to the tire equator line CL, and the ends thereof outward in the tire width direction open into tread ends (ground contact edges) 18 located on either side in the tire width direction. As illustrated in FIG. 1, the tread ends 18 are portions in which the external form of the tread portion 2 and the side portions 3 connect, and in cases in which these connecting portions are rounded, the external form of the tread portion 2 is referred to as the point of intersection of an extension line extending along the shape of the external form of the tread portion 2, and an extension line extending along the shape of the external form of the side portion 3.

In the shoulder lug grooves 10 positioned at both sides in the tire width direction, the position in the tire circumferential direction of one of the shoulder lug grooves 10 in one of the half-tread regions lies between the positions in the tire circumferential direction of two adjacent shoulder lug grooves disposed in the other half-tread region.

Further, in the shoulder lug grooves 10 in each of the half-tread regions, the position of the inward end in the tire width direction of the shoulder lug grooves 10 in the tire width direction is located further outward in the tire width direction as compared with the position of the end of the center lug groove 14 (discussed later) in the tire width direction, and in the tire circumferential direction, one shoulder lug groove 10 is disposed between adjacent center lug grooves 14, among the center lug grooves 14, adjacent in the tire circumferential direction, in each of the shoulder regions. In this manner, the circumferential primary grooves 12 (described later), form a wave-like shape of alternately connection ends of center lug groove 14 and inward ends of the shoulder lug grooves 10 in the tire width direction.

The pair of circumferential primary grooves 12 are disposed in half-tread regions at both sides (a first side and a second side) in the tire width direction with reference to the tire equator line CL. In each of the half-tread regions, the respective circumferential primary grooves 12 are formed to a wave-like shape in which the ends of the center lug grooves 14 (described later), and the ends of the shoulder lug grooves 10 inward in the tire width direction, connect alternately to extend around the entire circumference of the tire. The groove width of the circumferential primary grooves 12 is narrower than the groove width of the shoulder lug grooves 10. The grooves having a "wave-like shape" refers to sinuous shape; the primary groove turning portions where the grooves turn to define convex shapes outward or inward in the tire width direction to define a wave-like shape may be of angled shape or rounded curved shape. Curved shapes include shapes in which the corner portions of the rubber blocks that border the corner portions of the grooves are rounded to a fixed curvature radius, in other words, groove curved shapes produced by chamfering the corner portions of the rubber blocks. Portions other than the aforementioned primary groove turning portions may be of rectilinear shape or curved shape. In cases in which the primary groove turning portions and portions other than the primary groove turning portions are given curved shapes, the two curved shapes may be curved shapes having the same curvature radius. Additionally, for the two primary groove turning portions disposed adjacent in the tire circumferential direction, one of the primary groove turning portion may be of bent shape formed by a connecting of rectilinear shape groove and curved shape groove, and the other may be a curved shape primary groove turning portion.

Specifically, the circumferential primary grooves 12 have a plurality of primary groove turning portions 11 around the tire circumference that turn to define convex shapes outward and inward in the tire width direction, and the grooves extend in the tire circumferential direction sinuously in a wave-like shape in the tire width direction. Each of the pair of circumferential primary grooves 12 connects to the shoulder lug grooves 10 via a fifth groove turning portion 11a that, of the primary groove bending portions 11, bends to define convex shapes outward in the tire width direction. Additionally, each of the pair of circumferential primary grooves 12 connects to the center lug grooves 14 via a sixth groove turning portion 11b that, of the primary groove bending portions 11, bends to define convex shapes inward in the tire width direction. The positions of the sixth groove turning portions 11b in the tire circumferential direction are shifted in position with respect to the sixth groove turning portions 11b of the half-tread region on the opposite side. Consequently, the center lug grooves 14 extend in directions that are inclined with respect to the tire width direction. Further, the groove width of the pair of circumferential primary grooves 12 is narrower than the groove width of the shoulder lug grooves 10.

A plurality of the center blocks 16 are formed in a row in the tire circumferential direction and defined by the center lug grooves 14 (described later), and the pair of circumferential primary grooves 12. The tire equator line (tire center line) CL passes through the center blocks 16.

The plurality of center lug grooves 14 are spaced apart in the tire circumferential direction. The center lug grooves 14 have both ends and extend in the half-tread regions at both sides (the first side and the second side) in the tire width direction of the tire equator line CL and cross the tire equator line CL. The both ends of the center lug grooves 14 connect to the sixth groove turning portions 11b that, of the primary groove bending portions 11, bend to define convex shapes inward in the tire width direction. Consequently, the center lug grooves 14 are grooves that connect the sixth groove turning portions 11b to one another. The center lug grooves 14 intersect the tire equator line CL. The wave-like shapes of the pair of circumferential primary grooves 12 are both wave-like shapes having a predetermined wavelength, the phases of these two wave-like shapes being shifted by approximately half the pitch with respect to one another in the tire circumferential direction. Specifically, of the pair of circumferential primary grooves 12, the positions of the fifth groove turning portions 11a of one of the circumferential primary grooves 12 in the tire circumferential direction lie between the positions of fifth groove turning portions 11a that are adjacent to one another in the other circumferential primary groove 12 in the tire circumferential direction. Of the pair of circumferential primary grooves 12, the fifth groove turning portions 11a of the one circumferential primary groove 12, and the fifth groove turning portions 11a of the other circumferential primary groove 12, are disposed at approximately the same position in the tire circumferential direction.

Figure 3:
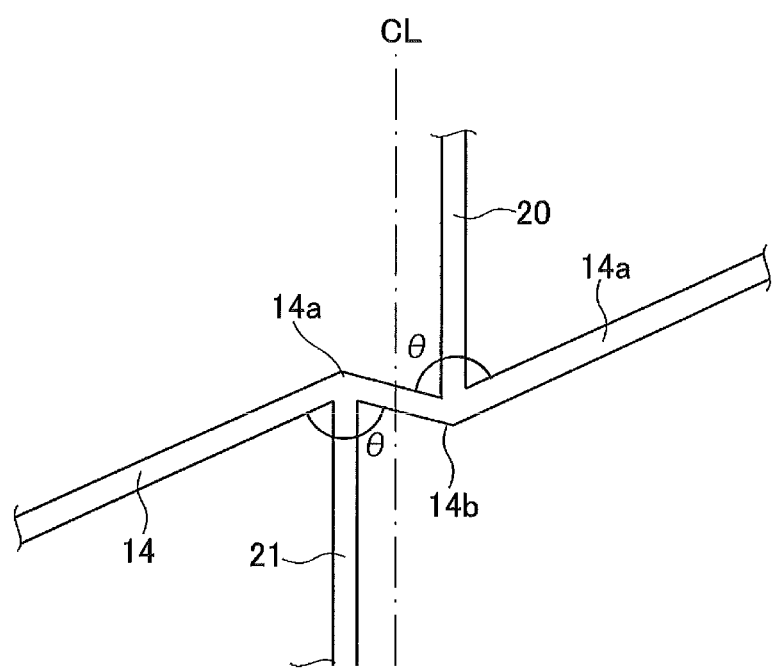
FIG. 3 is a diagram illustrating a region surrounding a groove turning portion of a center lug groove in the tread pattern of the present embodiment in an enlarged view.

The center lug grooves 14 are provided with a first groove turning portion 14a and a second groove turning portion 14b, which are two lug groove turning portions of bent shape. FIG. 3 is a diagram illustrating a first groove turning portion 14a and a second groove turning portion 14b of bent shape, in a center lug groove 14 in an enlarged view. In the present embodiment, the first groove turning portion 14a and the second groove turning portion 14b are of bent shape, but may also be of curved shape. Curved shapes include shapes in which the corner portions of the rubber blocks that border the corner portions of the grooves are rounded to a fixed curvature radius, in other words, groove curved shapes produced by chamfering the corner portions of the rubber blocks.

By having the first groove turning portion 14a and the second groove turning portion 14b, the center lug grooves 14 are displaced to wave-like shape in the tire circumferential direction. In a preferred practice, the shapes of the first groove turning portion 14a and the second groove turning portion 14b are, for example, shapes such that the turned angle θ of the center lug groove 14 formed by the first groove turning portion 14a and the second groove turning portion 14b (see FIG. 3) is an obtuse angle. In a preferred practice, the first groove turning portion 14a and the second groove turning portion 14b are disposed to either side of the tire equator line CL in the tire width direction, at positions equally distant from the tire equator line CL. In a preferred practice, in the center lug grooves 14, the tire equator line CL passes through a portion disposed between the first groove turning portion 14a and the second groove turning portion 14b. In a preferred practice, the orientation of the incline of the center lug groove 14 with respect to the tire width direction in this portion is different from the orientation of the incline of portions other than this portion. The center lug grooves 14 are provided with the first groove turning portion 14a and the second groove turning portion 14b, but at least one of these may be provided.

The center lug grooves 14 of the present embodiment have a configuration that includes straight portions extending in a rectilinear manner, the first groove turning portion 14a, and the second groove turning portion 14b, disposed between the pair of circumferential primary grooves 12; however, grooves of curved shape may be used instead of the straight portions. Alternatively, either the first groove turning portion 14a or the second groove turning portion 14b may have a bent shape, and the other may have a curved shape. Curved shapes include shapes in which the corner portions of the rubber blocks that border the corner portions of the grooves are rounded to a fixed curvature radius, in other words, curved shapes produced by chamfering the corner portions of the rubber blocks. In cases in which the first groove turning portion 14a and the second groove turning portion 14b have curved shapes, and the aforementioned straight portions are made into curved shapes as well, the two curved shapes may be curved shapes having the same curvature radius. Alternatively, either the first groove turning portion 14a or the second groove turning portion 14b may be a groove turning portion of bent shape formed by connecting grooves of rectilinear shape and of curved shape, and the other may be a groove turning portion of bent shape. The shape of the center lug grooves 14 should be a groove shape that extends in the tire width direction, while undergoing displacement to a wave-like shape in the tire circumferential direction.

Figure 4:
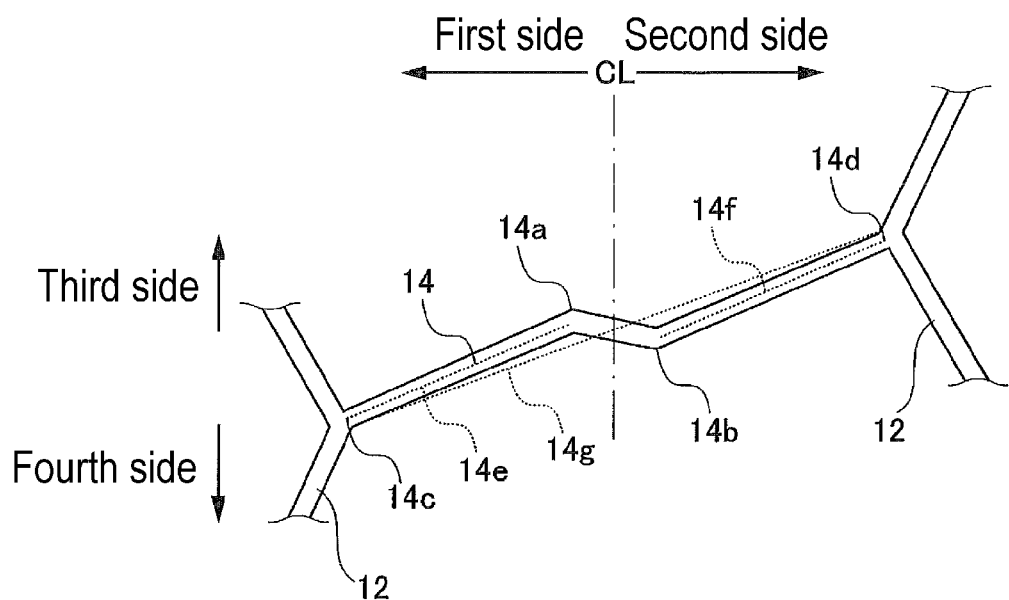
FIG. 4 is a diagram describing an example of a preferred shape of a center lug groove in the tread pattern of the present embodiment.

FIG. 4 is a diagram describing an example of a preferred shape of a center lug groove 14 which defines the shape of a center block 14. In FIG. 4, the circumferential secondary groove 20 which connects to the center lug groove 14 has been omitted from the illustration.

As illustrated in FIG. 4, the first groove turning portion 14a of the center lug groove 14 bents or curves so as to protrude towards a third side (the side at the top in the plane of the page in FIG. 4) in the tire circumferential direction at a first side (the left side in the plane of the page in FIG. 4), with reference to the tire equator line CL. The second groove turning portion 14b of the center lug groove 14 bents or curves so as to protrude towards a fourth side (the side at the bottom in the plane of the page in FIG. 4) in the tire circumferential direction at a second side (the right side in the plane of the page in FIG. 4), with reference to the tire equator line CL. The fourth side is the side opposite from the third side. Here, the first connection end portion 14c at which the center lug groove 14 connects to the circumferential primary groove 12 and the second connection end portion 14d at which the center lug groove 14 connects to the circumferential primary groove 12 correspond to the inward end of the circumferential primary groove 12 in the tire width direction, in other words, the sixth groove turning portions 11b, 11b. Because the center lug grooves 14 are inclined with respect to the tire width direction, the second connection end portion 14d of the center lug groove 14 is located further towards the third side (the side at the top in the plane of the page in FIG. 4) in the tire circumferential direction than the first connection end portion 14c.

At this time, it is preferable that, in relation to the center position of the center lug groove 14 in the groove width direction, an inclination angle (an inclination angle of greater than 0 degree but less than 90 degrees), with respect to the tire width direction, of a first straight line 14e that connects the first connection end portion 14c and the protruding end where the first groove turning portion 14a protrudes towards the third side (the side at the top in FIG. 3) in the tire circumferential direction, and an inclination angle (an inclination angle of greater than 0 degree but less than 90 degrees), with respect to the tire width direction, of a second straight line 14f that connects the second connection end portion 14d and the protruding end where the second groove bending portion 14b protrudes towards the fourth side in the tire circumferential direction, are greater than an inclination angle (an inclination angle of greater than 0 degree but less than 90 degrees), with respect to the tire width direction, of a third straight line 14g that connects the first connection end portion 14a and the second connection end portion 14d of the center lug groove 14.

In a more preferred configuration of the present embodiment, as illustrated in FIGS. 2, 4, in relation to the center position of the center lug groove 14 in the groove width direction, a segment of the center lug groove 14 disposed between the first connection end portion 14c and the protruding end where the first groove turning portion 14a protrudes towards the third side in the tire circumferential direction, is located on the first straight line 14e or towards the third side in relation to the first straight line 14e, and a portion of the center lug groove 14 disposed between the second connection end portion 14d and the protruding end where the second groove turning portion 14b protrudes towards the fourth side in the tire circumferential direction, is located on the second straight line 14f or towards the fourth side in relation to the second straight line 14f.

By forming the center blocks 16 in this manner, the tread rigidity of the center blocks 16 can be increased. In other words, by forming the center blocks 16 in an anisotropic shape defined by the center lug grooves 14 inclining in one direction with respect to the tire width direction, when the center blocks 16 separate from the road surface and are kicked back from the tire ground contact surface, the center blocks 16 twist and deform in clockwise rotation or counterclockwise rotation due to the anisotropic shape. At this time, because the groove width of the circumferential primary grooves 12 is narrow, the center blocks 16 interlock with the shoulder blocks located adjacent in the tire width direction, with the circumferential primary grooves 12 therebetween, at the fifth groove turning portions 11a and the sixth groove turning portions 11b and function integrally, and the center blocks 16 adjacent in the circumferential direction, with the center lug grooves 14 therebetween, interlock with the first groove bending portions 14a and the second groove bending portions 14b and function integrally, the tread rigidity of the center blocks 16 can be increased. By increasing the tread rigidity of the center blocks 16, twisting of the center blocks 16 can be suppressed, and wear in sections of the center blocks 16 at either side of the center lug grooves 14 in the tire circumferential direction can be suppressed.

Further, when the center blocks 16 separate from the road surface and are kicked back, portions of the center blocks 16 experience collapse deformation caused by shear force in the tire circumferential direction acting on the aforementioned portions of the center blocks 16 due to the interaction with the road surface. Because the center lug grooves 14 are provided with the first groove turning portions 14a and the second groove turning portions 14b, at this time, land portions around the first groove turning portions 14a and the second groove turning portions 14b of the center blocks 16 interlock with one another, and pairs of blocks adjacent in the tire circumferential direction function as single blocks, generating counter force. Consequently, the tread rigidity of the center blocks 16 can be increased by providing the first groove turning portions 14a and the second groove turning portions 14b to the center lug grooves 14. By increasing the tread rigidity of the center blocks 16, center blocks 16 can be prevented from collapsing. Thus, localized wear in the center blocks 16 at either side of the center lug grooves 14 in the tire circumferential direction can be suppressed.

The circumferential secondary grooves 20 are grooves which interconnect, among the center lug grooves 14, center lug grooves 14 adjacent to one another in the tire circumferential direction. The groove depth of the circumferential secondary grooves 20 may be shallower compared to the maximum groove depth of the circumferential primary grooves 12. In this manner, the circumferential secondary grooves 20 will have at least one groove turning portion of bent or curved shape. The circumferential secondary grooves 20 of the present embodiment have the third groove turning portions 21a and the fourth groove turning portions 21b.

As illustrated in FIG. 2, the circumferential secondary grooves 20 have linking groove portions (straight portions) that extend parallel to the tire circumferential direction from the center lug grooves 14, the third groove turning portions 21a and the fourth groove turning portions 21b connecting to the linking groove portions (straight portions), and intermediate groove portions extending between the third groove turning portions 21a and the fourth groove turning portions 21b and incline in the tire circumference direction. In a case in which the shapes of the third groove turning portions 21a and the fourth groove turning portions 21b are curved shapes, these curved shapes include shapes in which the corner portions of the rubber blocks that border the corner portions of the grooves are rounded to a fixed curvature radius, in other words, groove curved shapes produced by chamfering the corner portions of the rubber blocks. One of the third groove turning portions 21a or the fourth groove turning portions 21b may be bent shapes and the other may be curved shapes. Additionally, one of the third groove turning portions 21a or the fourth groove turning portions 21b may be groove turning portions of bent shape formed by connected rectilinear grooves and curved shaped grooves, while the other may be groove turning portions of curved shape.

In the example illustrated in FIG. 2, in a preferred practice, the shapes of the third groove turning portions 21a and the fourth groove turning portions 21b provided to the circumferential secondary grooves 20 are bent shapes, and the turned angle φ (see FIG. 2), of the circumferential secondary grooves 20, produced by the third groove turning portions 21a and the fourth groove bending portions 21b is an obtuse angle. In a preferred practice, the circumferential secondary grooves 20 connect to the center lug grooves 14 at, for example, locations of ends of the first groove bending portions 14a and the second groove turning portions 14b of the center lug grooves 14 (specifically, locations of maximum protrusion in the tire circumferential direction, from a hypothetical line linking the both ends of the center lug grooves 14). The linking groove portions (straight portions) in the circumferential secondary groove 20 need not extend parallel to the tire circumferential direction. In a preferred practice, as illustrated in FIG. 2, in the circumferential secondary grooves 20, intermediate groove portions thereof that joins the third groove turning portions 21a and the fourth groove turning portions 21b are intersected by the tire equator line CL.

As illustrated in FIG. 3, the linking groove portions (straight portions) of the circumferential secondary grooves 20 have rectilinear shapes that extend parallel to the tire circumferential direction, but the linking groove portions may have curved shapes that curve, instead of this rectilinear shape. As stated above, the circumferential secondary grooves 20 have the linking groove portions, the third groove turning portions 21a, the fourth groove turning portions 21b, and the intermediate groove portions; however, a groove shape that extends in the tire circumferential direction while undergoing displacement to a wave-like shape in the tire circumferential direction may also be used instead of this shape. In a case in which the linking groove portions have bent shapes, and the third groove turning portions 21a and the fourth groove turning portions 21b have curved shapes, the two curved shapes may be curved shapes having the same curvature radius.

By providing the circumferential secondary grooves 20 in such manner, excessively high block rigidity of the center blocks 16 can be alleviated. As a result, a lopsided shape can be avoided in which the curvature radius of the profile shape indicating the external shape of the tread portion 2 when inflating with air pressure is large in a center region (the region where the center blocks 16 are located), while the curvature radius becomes sharply smaller in the shoulder regions (the regions where the shoulder lug grooves 10 are located), and a profile shape in which the change in the profile shape in the tread portion 2 is gradual from the center region to the shoulder regions can be achieved. As a result, localized wear tending to occur around the circumferential primary grooves 12, whose curvature ratios vary greatly, can be suppressed.

By providing the third groove turning portion 21a and the fourth groove turning portion 21b to the circumferential secondary grooves 20, when the center blocks 16 separate from the road surface and are kick back during travel of the tire 1 over the road surface, when each portion of the center blocks 16 which are split into two regions by the circumferential secondary grooves 20 experience collapse deformation caused by shear force in the tire circumferential direction acting on the aforementioned portions of the center blocks 16 by the portions from the road surface, the land portions of the center blocks 16 around the third groove turning portion 21a and the fourth groove turning portion 21b interlock with one another and function to generate counter force as a single block due to the third groove turning portions 21a and the fourth groove turning portions 21b, excessive decrease in the tread rigidity can be suppressed, even in the center blocks 16 where the circumferential secondary grooves 20 are formed. Because excessive decrease in the tread rigidity of the center blocks 16 can be suppressed, and collapse of the center blocks 16 can be suppressed, heel and toe wear of the center blocks 16 can be suppressed.

Further, a ratio D3/LB of the maximum groove depth D3 (see FIG. 1) of the center lug grooves 14 to the maximum width LB (see FIG. 2) of the center blocks in the tire circumferential direction is from 0.1 to 0.3. By setting the ratio D3/LB to the range above, decline in the block rigidity of the center blocks 16 can be suppressed, and slip with respect to the road surface within the center blocks 16 can be made approximately constant irrespective of the location, heel and toe wear can be suppressed. In FIG. 1, the groove bottom of the center lug groove 14 is indicated by a broken line.

Figure 5:
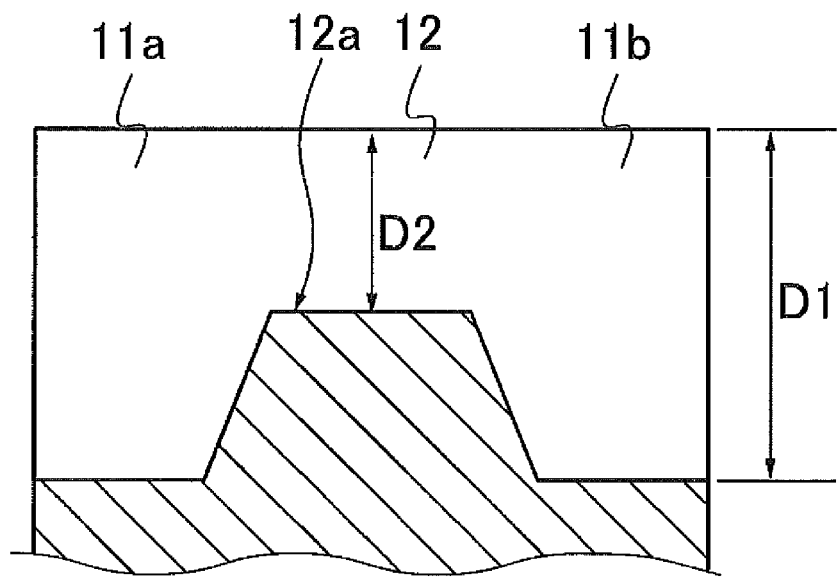
FIG. 5 is a diagram illustrating an example of a raised bottom portion of a circumferential primary groove in the tread pattern of the present embodiment.

In a preferred configuration of the tread pattern, each of the pair of circumferential primary grooves 12 is provided with a raised bottom portion 12a which is a portion where the groove depth is shallow. FIG. 5 is a drawing illustrating an example of a raised bottom portion 12a. By providing the raised bottom portions 12a to the circumferential primary grooves 12, the tread rigidity of the center blocks 16 can be ensured in a predetermined range, and collapse of the center blocks 16, which are effective for traction performance, can be suppressed. Further, because collapse of the center blocks 16 is suppressed, heel and toe wear of the center blocks 16 can be suppressed.

As illustrated in FIG. 5, the raised bottom portions 12a are disposed in portions that extend on an incline with respect to the tire circumferential direction which are disposed between the fifth groove turning portions 11a and the sixth groove turning portions 11b; however, it may also be disposed in regions of the fifth groove turning portions 11a and the sixth groove turning portions 11b in the circumferential primary grooves 12. The circumferential primary grooves 12 have uniform maximum depth regions where the groove depth is greatest, and the portions in these regions where the groove depth is shallow are the raised bottom portions 12a. In a preferred practice, the maximum groove depth of the depth of the circumferential primary grooves 12 is the same as the groove depth of the shoulder lug grooves 10.

The configuration of the raised bottom portions 12a may be one in which the groove depth of the portions become shallow discontinuously stepwise from the maximum depth regions, one in which the groove depth of the portions become shallow gradually from the maximum depth regions, or one in which the groove depth of the portions become shallow all at once, and thereafter decrease in groove depth within a range that is less than the groove depth of the maximum depth regions. In this manner, the raised bottom portions 12a may have a uniform shallow depth, but it is not necessary for the portions to have a uniform shallow depth, and the groove depth may vary.

In a preferred practice, at this time, the ratio D2/T of the shallowest groove depth D2 (see FIG. 5) in the raised bottom portions 12a to the tread width T (see FIG. 2) in the tire width direction of the tread portion is less than 0.05. When the ratio D2/T is 0.05 or greater, the groove depth of the raised bottom portions will be shallow in comparison with the tread width T, making it difficult to suppress block collapse of the center blocks 16. In a preferred practice, the ratio D2/T is 0.04 or less, for example, 0.03. The lower limit for the ratio D2/T is not particularly limited but, for example, is 0.01. When the ratio D2/T is 0.05 or greater, the groove depth of the raised bottom portions will be shallow in comparison with the tread width T, a difference between the block rigidity around the raised bottom portions of the center blocks 16 and the block rigidity of the central portion of the center blocks 16 (the inside portion away from the edges of the grooves having the raised bottom portions) will be large, and uneven wear will tend to occur.

In a preferred practice, a ratio D1/T of the maximum groove depth D1 (see FIG. 5) of the circumferential primary grooves 12 to the tread width T of the tread portions 2 is from 0.03 to 0.09. When the maximum groove depth D1 of the circumferential primary grooves 12 is deep and the ratio D1/T exceeds 0.09, there is an excessive decline in the block rigidity of the center blocks 16, and there is a tendency for heel and toe wear to be large. When the maximum groove depth D1 of the circumferential primary grooves 12 is shallow and the ratio D1/T is less than 0.03, the center lug grooves 14 tend to disappear, and the wear life is very short.

Also, in a preferred practice, the linking groove portions of the circumferential secondary grooves 20 described above are portions that join each of the third groove turning portion 21a and the fourth groove turning portion 21b to the contact point of the circumferential secondary grooves 20 and one of the center lug grooves 14, the linking groove portions having an inclination angle of from 0 to 5 degrees with respect to the tire circumferential direction. Even when grooves of curved shape are employed as the linking groove portions, the inclination angle is preferably from 0 to 5 degrees. Because the inclination angle is 5 degrees or less, when the center blocks 16 experience deformation induced by the center blocks 16 collapsing in the tire circumferential direction caused by the shear force generated when separate from the road surface and kicked back, the deformation induced by the collapse is transmitted to the vicinity of the third groove turning portion 21a and the fourth groove turning portion 21b. The third groove turning portions 21a and the fourth groove turning portions 21b can suppress collapse in the manner described above. Consequently, heel and toe wear of the center blocks 16 can be suppressed.

In a preferred practice, the maximum groove depth D5 (see FIG. 1) of the linking groove portions of the circumferential secondary grooves 20 is shallower compared to the maximum groove depth D3 (see FIG. 1) of the center lug grooves 14, so as to be able to suppress excessive decrease in the tread rigidity of the center blocks 16, which affect heel and toe wear. More specifically, in a preferred practice, the ratio D5/D3 of the maximum groove depth D5 to the maximum groove depth D3 is from 0.3 to 0.75. By setting the ratio D5/D3 to the range above, heel and toe wear in the center blocks 16 can be efficiently suppressed.

In a preferred practice, the groove width P6 (see FIG. 2) of the intermediate groove portions that connect the third groove turning portions 21a and the fourth groove turning portions 21b of the circumferential secondary grooves 20 is equal to the maximum groove width P5 (see FIG. 2) of the linking groove portions that link a connection point between the circumferential secondary grooves 20 and one of the center lug grooves 14, or is greater than the maximum groove width P5. As a result, the difference between the localized block rigidity near the edge of the outer edges of the center blocks 16, and the localized block rigidity near the intermediate groove portions can be reduced, and wear within the region of the center blocks 16, can be made uniform. Specifically, by setting the ratio P6/P5 to 1 or greater and 2.5 or less, wear within the region of the center blocks 16 can be efficiently made uniform.

It is preferred that, as illustrated in FIG. 4, two starting locations, in the tire width direction, of the circumferential secondary grooves 20 which respectively extend from the center lug grooves 14 are mutually shifted in position, from the view point that the starting locations of the circumferential secondary grooves 20 which tend to function as center for localized wear can be dispersed.

Also, it is preferred that the two starting locations, in the tire width direction, of the circumferential secondary grooves 20 in the center lug grooves 14 are located at mutually different sides with reference to the tire equator line CL, from the view point that wear can be suppressed by the starting locations distributed to both sides in the tire width direction.

It is preferred that, the center blocks 16 have corners formed in corresponding fashion to the fifth groove turning portions 11a which are portions that turn in convex shapes protruding outward in the tire width direction in the wave-like shaped circumferential primary grooves 12, and the corners all have obtuse angles, from the view point that collapse of the center blocks 16 when the corner portions receive braking force, driving force, or lateral force can be suppressed, and the corner portions can be prevented from becoming center of the production of wear.

Additionally, it is preferred that the groove widths of the pair of circumferential primary grooves 12 and the center lug grooves 14 are all from 7 to 20 mm, from the view point that the center blocks 16 can have the edge component necessary for traction performance, and localized wear which tends to occur around the circumferential primary grooves 12 and the center lug grooves 14 can be suppressed.

In a preferred practice, the tire 1 is for mounting on a construction vehicle or an industrial vehicle. Construction vehicles and industrial vehicles include dump trucks, scrapers, graders, shovel loaders, tire rollers, wheel cranes, and truck cranes, or compactors, earthmovers, graders, loaders and dozers, and the like.

With the tread pattern of the tire 1 of the present embodiment, circumferential secondary grooves 20 that interconnect, among center lug grooves 14, center lug grooves 14 adjacent in the tire circumferential direction, are formed in the center blocks 16 region, and each of the circumferential secondary grooves 20 is provided with at least one groove turning portion. For this reason, the profile shape of the external form of the tread portion 2 can be given a profile shape having a gradually varying curvature. Therefore, uneven wear can be suppressed. Meanwhile, there is a concern in a decrease in tread rigidity of the center blocks 16 due to the provision of the circumferential secondary grooves 20, but because the third groove turning portions 21a and the fourth groove turning portions 21b are provided, the decrease in tread rigidity of the center blocks 16 can be suppressed. As a result, collapse of the center blocks 16 due to shear force in the tire circumferential direction caused by the center blocks 16 separate from the road surface and kicked back, in the rotation of the tire 1, can be suppressed. Consequently, heel and toe wear of the center blocks 16 can be suppressed.

Working Examples, Conventional Example, Comparative Examples

To examine the effects of a tire according to the present embodiment, test tires with varying tread patterns were manufactured and the heel and toe wear for each was tested. The size of the test tires was 46/90R57. The tires were mounted on a rim size of 29.00-6.0 (TRA specified rim), and under test conditions of 700 kPa (TRA specified air pressure) and an applied load of 617.81 kN (TRA specified load), a 200-ton dump truck was used to drive the tires over an off-road road surface. After 5,000 hours of running, the difference in grade of the blocks resulting from heel and toe wear in the center blocks was obtained, and the inverse was used for indexing. The Conventional Example is defined as the standard (index value 100). A higher index value indicate less heel and toe wear.

Test tires according to Conventional Example, Working Examples 1 to 28, and Comparative Examples 1 to 4 were manufactured.

Figure 6:
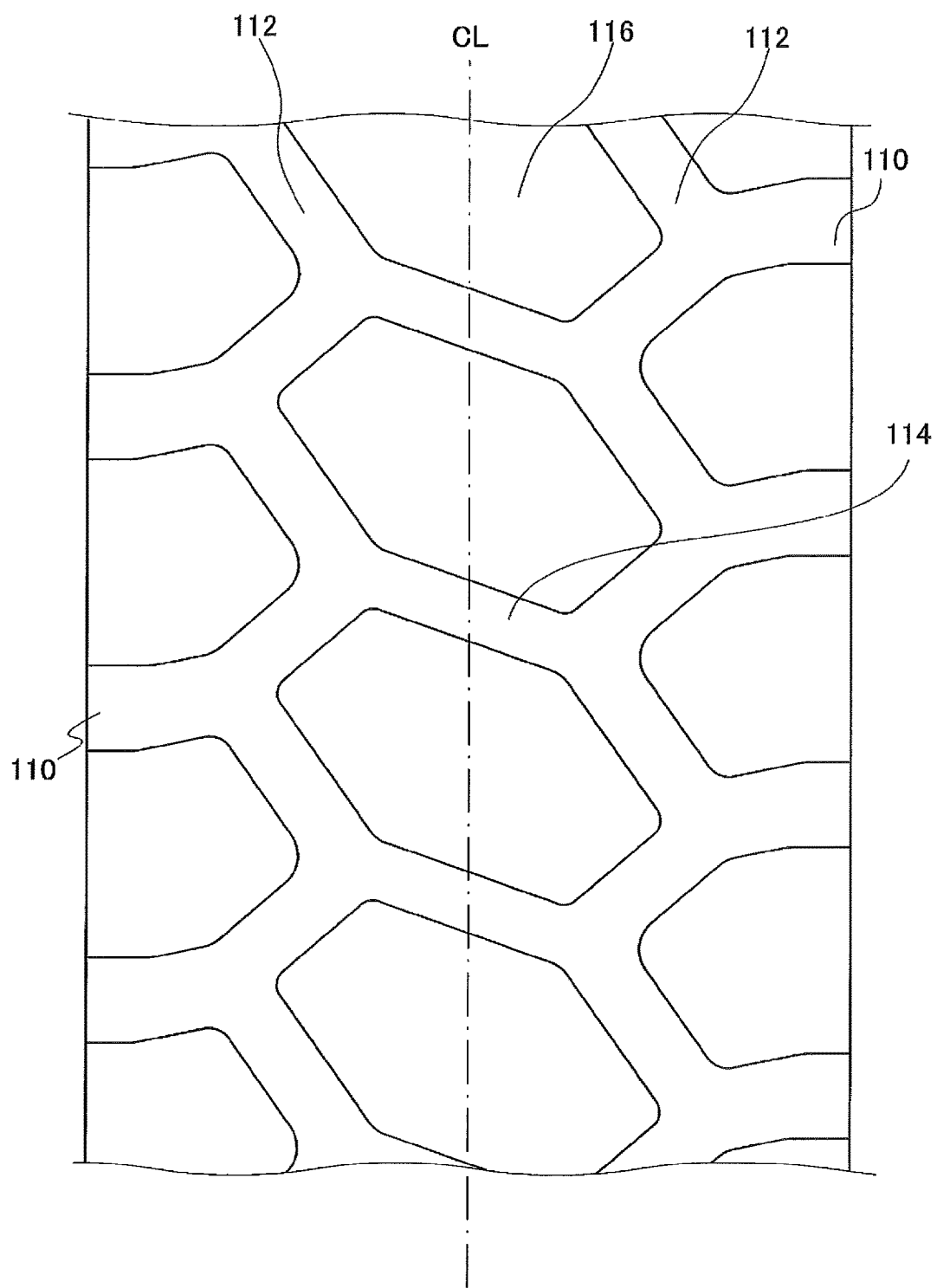
FIG. 6 is a diagram illustrating a conventional tread pattern of a pneumatic tire.

FIG. 6 is a diagram illustrating a tread pattern of a conventional example. The tread pattern illustrated in FIG. 6 is provided with shoulder lug grooves 110, a pair of circumferential primary grooves 112, center lug grooves 114, and center blocks 116. The shoulder lug grooves 110, the pair of circumferential primary grooves 112, the center lug grooves 114, and the center blocks 116 have respectively the same configuration as their counterparts the shoulder lug grooves 10, the pair of circumferential primary grooves 12, the center lug grooves 14, and the center blocks 16. The groove width of the shoulder lug grooves 110 and the groove width of the circumferential primary grooves 112 are the same as the groove width of the shoulder lug grooves 110. Because the groove width of the circumferential primary grooves 112 is the same as the shoulder grooves 10, as with the circumferential primary grooves 12 illustrated in FIG. 2, the circumferential primary grooves are not narrower in groove width than the shoulder lug grooves 10, and therefore in Table 1 below, it is assumed that there are no wave-like shaped circumferential primary grooves.

Working Examples 1 to 28 and Comparative Examples 1 to 4 employ the tread patterns illustrated in FIG. 2 or FIG. 6.

The configuration of the components and the evaluation results of heel and toe wear of the tread pattern are shown in Tables 1 to 6 below.

In Table 1, evaluation results are shown for tread patterns based on the tread pattern illustrated in FIG. 2, the tread patterns have varies changes in the presence or absence of wave-like shaped circumferential primary grooves, the presence or absence of circumferential secondary grooves and lug groove turning portions (first groove turning portions 14a and second groove turning portions 14b) of center lug grooves, the presence or absence of third groove turning portions 21a and fourth groove turning portions 21b of circumferential secondary grooves, and the ratio D3/LB (Working Examples 1 to 3, Comparative Examples 1 to 4).

In Table 2, evaluation results are shown for tread patterns based on the tread pattern illustrated in FIG. 2, the tread patterns have varies changes in the ratio D2/T (Working Examples 4 to 8).

In Table 3, evaluation results are shown for tread patterns based on the tread pattern illustrated in FIG. 2, the tread patterns have various changes in the ratio D1/T while fixing the ratio D3/LB at 0.2 and the ratio D2/T at 0.03 (Working Examples 9 to 13).

In Table 4, evaluation results are shown for tread patterns based on the tread pattern illustrated in FIG. 2, the tread patterns have various changes in the inclination angle, with respect to the tire circumferential direction, of the linking groove portions of the circumferential secondary grooves 20, which extend parallel to the tire circumferential direction from the center lug grooves 14, while fixing the ratio D3/LB at 0.2, the ratio D2/T at 0.03, and the ratio D1/T at 0.06 (Working Examples 14 to 17).

In Table 5, evaluation results are shown for tread patterns based on the tread pattern illustrated in FIG. 2, the tread patters have various changes in the ratio D5/D3, while fixing the ratio D3/LB 0.2, the ratio D2/T at 0.03, the ratio D1/T at 0.06, and the inclination angle of the linking groove portions with respect to the tire circumferential direction at 3 degrees (Working Examples 18 to 22).

In Table 6, evaluation results are shown for tread patterns based on the tread pattern illustrated in FIG. 2, the tread patterns have various changes in the ratio P6/P5, while fixing the ratio D3/LB at 0.2, the ratio D2/T at 0.03, the ratio D1/T at 0.06, the inclination angle of the linking groove portions with respect to the tire circumferential direction at 3 degrees, and the ratio D5/D3 at 0.5 (Working Examples 23 to 28).

In Tables 1 to 6, "presence or absence of position shift of the two starting positions of the circumferential secondary grooves in the tire width direction in the center lug grooves" refers to whether or not the starting positions of the two circumferential secondary grooves 20 which extend towards both sides in the tire circumferential direction with one center lug groove 14 therebetween are shifted in position in the tire width direction, as illustrated in FIG. 2. In a case the position shift exists, the position shift distance was 8% of the tread width T.

From Table 1, it is seen that when circumferential primary grooves, first groove turning portions 14a and second groove turning portions 14b, circumferential secondary grooves 20, and third groove turning portions 21a and fourth groove turning portions 21b are present, and the ratio D3/LB is from 0.1 to 0.3, heel and toe wear is enhanced.

In comparing the Working Example 4 of Table 2 and Working Example 1 of Table 1, it is seen that heel and toe wear is enhanced by the presence of raised bottom portions in the circumferential secondary grooves. From Working Examples 4 to 8 of Table 2, it is seen that setting the ratio D2/T to less than 0.05 is preferable in terms of enhancing heel and toe wear.

From Working Examples 9 to 13 of Table 3, it is seen that setting the ratio D1/T to 0.03 to 0.09 is preferable in terms of enhancing heel and toe wear.

From Working Examples 14 to 17 of Table 4, is seen that setting the inclination angle of the linking groove portions to from 0 to 5 degrees is preferable in terms of enhancing heel and toe wear.

From Working Examples 18 to 22 of Table 5, it is seen that setting the ratio D5/D3 to from 0.3 to 0.7 is preferable in terms of enhancing heel and toe wear.

From Working Examples 23 to 27 of Table 6, it is seen that setting the ratio P6/P5 to from 1.0 to 2.5 is preferable in terms of enhancing heel and toe wear. In comparing the Working Examples 25 and 28 of Table 6, it is seen that shifting in position in the starting locations of the circumferential secondary grooves in the tire width direction is preferable in terms of enhancing heel and toe wear.

TABLE 1

|  | Conventional Example | Comparative Example 1 | Comparative Example 2 | Comparative Example 3 |
|---|---|---|---|---|
| Presence/absence of wave-like shaped circumferential primary grooves | Absence | Presence | Presence | Presence |
| Presence/absence of first and second groove turning portions and circumferential secondary grooves of center lug grooves | Absence | Absence | Presence | Presence |
| Presence/absence of third and fourth groove turning portions of circumferential secondary grooves | Absence | Absence | Absence | Presence |
| D3/LB | — | — | — | 0.05 |
| Presence/absence of raised bottom portion of circumferential primary groove | Absence | Absence | Absence | Absence |
| D2/T | 0.07 | 0.07 | 0.07 | 0.07 |
| D1/T | 0.09 | 0.09 | 0.09 | 0.09 |
| Inclination angle of lateral grooves | — | — | — | 0 degrees |
| D5/D3 | — | — | — | 0.4 |
| P6/P5 | — | — | — | 1.5 |
| Presence/absence of position shift of two starting locations of circumferential secondary grooves in tire width direction, in center lug grooves | — | — | Presence | Presence |
| Uneven wear resistance (Heel and toe wear resistance) | 100 | 102 | 103 | 104 |

|  | Working Example 1 | Working Example 2 | Working Example 3 | Comparative Example 4 |
|---|---|---|---|---|
| Presence/absence of wave-like shaped circumferential primary grooves | Presence | Presence | Presence | Presence |
| Presence/absence of first and second groove turning portions and circumferential secondary grooves of center lug grooves | Presence | Presence | Presence | Presence |
| Presence/absence of third and fourth groove turning portions of circumferential secondary grooves | Presence | Presence | Presence | Presence |

TABLE 1-continued

| | | | | |
|---|---|---|---|---|
| D3/LB | 0.1 | 0.2 | 0.3 | 0.4 |
| Presence/absence of raised bottom portion of circumferential primary groove | Absence | Absence | Absence | Absence |
| D2/T | 0.07 | 0.07 | 0.07 | 0.07 |
| D1/T | 0.09 | 0.09 | 0.09 | 0.09 |
| Inclination angle of lateral grooves | 0 degrees | 0 degrees | 0 degrees | 0 degrees |
| D5/D3 | 0.4 | 0.4 | 0.4 | 0.4 |
| P6/P5 | 1.5 | 1.5 | 1.5 | 1.5 |
| Presence/absence of position shift of two starting locations of circumferential secondary grooves in tire width direction, in center lug grooves | Presence | Presence | Presence | Presence |
| Uneven wear resistance (Heel and toe wear resistance) | 108 | 110 | 109 | 104 |

TABLE 2

| | Working Example 4 | Working Example 5 | Working Example 6 | Working Example 7 | Working Example 8 |
|---|---|---|---|---|---|
| Presence/absence of wave-like shaped circumferential primary grooves | Presence | Presence | Presence | Presence | Presence |
| Presence/absence of first and second groove turning portions and circumferential secondary grooves of center lug grooves | Presence | Presence | Presence | Presence | Presence |
| Presence/absence of third and fourth groove turning portions of circumferential secondary grooves | Presence | Presence | Presence | Presence | Presence |
| D3/LB | 0.2 | 0.2 | 0.2 | 0.2 | 0.2 |
| Presence/absence of raised bottom portion of circumferential primary groove | Presence | Presence | Presence | Presence | Presence |
| D2/T | 0.07 | 0.05 | 0.04 | 0.03 | 0.02 |
| D1/T | 0.09 | 0.09 | 0.09 | 0.09 | 0.09 |
| Inclination angle of lateral grooves | 0 degrees | 0 degrees | 0 degrees | 0 degrees | 0 degrees |
| D5/D3 | 0.4 | 0.4 | 0.4 | 0.4 | 0.4 |
| P6/P5 | 1.5 | 1.5 | 1.5 | 1.5 | 1.5 |
| Presence/absence of position shift of two starting locations of circumferential secondary grooves in tire width direction, in center lug grooves | Presence | Presence | Presence | Presence | Presence |
| Uneven wear resistance (Heel and toe wear resistance) | 112 | 113 | 114 | 117 | 114 |

TABLE 3

| | Working Example 9 | Working Example 10 | Working Example 11 | Working Example 12 | Working Example 13 |
|---|---|---|---|---|---|
| Presence/absence of wave-like shaped circumferential primary grooves | Presence | Presence | Presence | Presence | Presence |
| Presence/absence of first and second groove turning portions and circumferential secondary grooves of center lug grooves | Presence | Presence | Presence | Presence | Presence |
| Presence/absence of third and fourth groove turning portions of circumferential secondary grooves | Presence | Presence | Presence | Presence | Presence |
| D3/LB | 0.2 | 0.2 | 0.2 | 0.2 | 0.2 |
| Presence/absence of raised bottom portion of circumferential primary groove | Presence | Presence | Presence | Presence | Presence |
| D2/T | 0.03 | 0.03 | 0.03 | 0.03 | 0.03 |
| D1/T | 0.02 | 0.03 | 0.06 | 0.08 | 0.09 |
| Inclination angle of lateral grooves | 0 degrees | 0 degrees | 0 degrees | 0 degrees | 0 degrees |
| D5/D3 | 0.4 | 0.4 | 0.4 | 0.4 | 0.4 |
| P6/P5 | 1.5 | 1.5 | 1.5 | 1.5 | 1.5 |
| Presence/absence of position shift of two starting locations of circumferential secondary grooves in tire width direction, in center lug grooves | Presence | Presence | Presence | Presence | Presence |
| Uneven wear resistance (Heel and toe wear resistance) | 114 | 116 | 119 | 116 | 117 |

TABLE 4

|  | Working Example 14 | Working Example 15 | Working Example 16 | Working Example 17 |
|---|---|---|---|---|
| Presence/absence of wave-like shaped circumferential primary grooves | Presence | Presence | Presence | Presence |
| Presence/absence of first and second groove turning portions and circumferential secondary grooves of center lug grooves | Presence | Presence | Presence | Presence |
| Presence/absence of third and fourth groove turning portions of circumferential secondary grooves | Presence | Presence | Presence | Presence |
| D3/LB | 0.2 | 0.2 | 0.2 | 0.2 |
| Presence/absence of raised bottom portion of circumferential primary groove | Presence | Presence | Presence | Presence |
| D2/T | 0.03 | 0.03 | 0.03 | 0.03 |
| D1/T | 0.06 | 0.06 | 0.06 | 0.06 |
| Inclination angle of lateral grooves | 1 degree | 3 degrees | 5 degrees | 6 degrees |
| D5/D3 | 0.4 | 0.4 | 0.4 | 0.4 |
| P6/P5 | 1.5 | 1.5 | 1.5 | 1.5 |
| Presence/absence of position shift of two starting locations of circumferential secondary grooves in tire width direction, in center lug grooves | Presence | Presence | Presence | Presence |
| Uneven wear resistance (Heel and toe wear resistance) | 120 | 122 | 119 | 117 |

TABLE 5

|  | Working Example 18 | Working Example 19 | Working Example 20 | Working Example 21 | Working Example 22 |
|---|---|---|---|---|---|
| Presence/absence of wave-like shaped circumferential primary grooves | Presence | Presence | Presence | Presence | Presence |
| Presence/absence of first and second groove turning portions and circumferential secondary grooves of center lug grooves | Presence | Presence | Presence | Presence | Presence |
| Presence/absence of third and fourth groove turning portions of circumferential secondary grooves | Presence | Presence | Presence | Presence | Presence |
| D3/LB | 0.2 | 0.2 | 0.2 | 0.2 | 0.2 |
| Presence/absence of raised bottom portion of circumferential primary groove | Presence | Presence | Presence | Presence | Presence |
| D2/T | 0.03 | 0.03 | 0.03 | 0.03 | 0.03 |
| D1/T | 0.06 | 0.06 | 0.06 | 0.06 | 0.06 |
| Inclination angle of lateral grooves | 3 degrees | 3 degrees | 3 degrees | 3 degrees | 3 degrees |
| D5/D3 | 0.25 | 0.3 | 0.5 | 0.75 | 0.8 |
| P6/P5 | 1.5 | 1.5 | 1.5 | 1.5 | 1.5 |
| Presence/absence of position shift of two starting locations of circumferential secondary grooves in tire width direction, in center lug grooves | Presence | Presence | Presence | Presence | Presence |
| Uneven wear resistance (Heel and toe wear resistance) | 116 | 121 | 124 | 117 | 116 |

TABLE 6

|  | Working Example 23 | Working Example 24 | Working Example 25 | Working Example 26 | Working Example 27 | Working Example 28 |
|---|---|---|---|---|---|---|
| Presence/absence of wave-like shaped circumferential primary grooves | Presence | Presence | Presence | Presence | Presence | Presence |
| Presence/absence of first and second groove turning portions and circumferential secondary grooves of center lug grooves | Presence | Presence | Presence | Presence | Presence | Presence |
| Presence/absence of third and fourth groove turning portions of circumferential secondary grooves | Presence | Presence | Presence | Presence | Presence | Presence |

TABLE 6-continued

| | Working Example 23 | Working Example 24 | Working Example 25 | Working Example 26 | Working Example 27 | Working Example 28 |
|---|---|---|---|---|---|---|
| D3/LB | 0.2 | 0.2 | 0.2 | 0.2 | 0.2 | 0.2 |
| Presence/absence of raised bottom portion of circumferential primary groove | Presence | Presence | Presence | Presence | Presence | Presence |
| D2/T | 0.03 | 0.03 | 0.03 | 0.03 | 0.03 | 0.03 |
| D1/T | 0.06 | 0.06 | 0.06 | 0.06 | 0.06 | 0.06 |
| Inclination angle of lateral grooves | 3 degrees | 3 degrees | 3 degrees | 3 degrees | 3 degrees | 3 degrees |
| D5/D3 | 0.5 | 0.5 | 0.5 | 0.5 | 0.5 | 0.5 |
| P6/P5 | 0.9 | 1 | 1.7 | 2.5 | 2.7 | 1.7 |
| Presence/absence of position shift of two starting locations of circumferential secondary grooves in tire width direction, in center lug grooves | Presence | Presence | Presence | Presence | Presence | Absence |
| Uneven wear resistance (Heel and toe wear resistance) | 121 | 123 | 125 | 123 | 120 | 119 |

This clearly demonstrates the effect of the tire of the present embodiment.

The foregoing has been a detailed description of the pneumatic tire of the present technology. However, the present technology is not limited to the above embodiments, and may be enhanced or modified in various ways within the scope of the present technology.

The invention claimed is:

1. A heavy duty pneumatic tire comprising
a tread pattern,
the tread pattern comprising:
a plurality of center lug grooves spaced apart in a tire circumferential direction, the plurality of center lug grooves having two ends and extending in half-tread regions on a first side and a second side in a tire width direction with reference to a tire equator line to cross the tire equator line;
a plurality of shoulder lug grooves spaced apart in the tire circumferential direction, extending outward in the tire width direction in each of the half-tread regions, having ends outward in the tire width direction opening at ground contact edges disposed on either side in the tire width direction, the plurality of shoulder lug grooves being configured so that, in the tire circumferential direction, one shoulder lug groove of the plurality of shoulder lug grooves is provided in between the ends of adjacent center lug grooves, among the center lug grooves, adjacent in the tire circumferential direction;
a pair of circumferential primary grooves disposed in the half-tread regions and formed, in each of the half-tread regions, to extend around an entire circumference of the tire in a wave-like shape with a groove width less than that of the plurality of shoulder lug grooves, in such a way as to alternately connect the ends of the center lug grooves and inward ends of the shoulder lug grooves in the tire width direction;
a plurality of center blocks defined by the plurality of center lug grooves and the pair of circumferential primary grooves and formed in a row in the tire circumferential direction; and
circumferential secondary grooves formed in regions of the center blocks, interconnecting center lug grooves, among the center lug grooves, adjacent in the tire circumferential direction;
each of the center lug grooves having at least one lug groove turning portion with a bent or curved shape,
each of the circumferential secondary grooves having at least one secondary groove turning portion with a bent or curved shape, and connecting to the center lug grooves at the lug groove turning portion,
the at least one secondary groove turning portion being provided with a third groove turning portion and a fourth groove turning portion, linking groove portions linking between either one of the positions of the third groove turning portion and the fourth groove turning portion, and a connecting portion between the circumferential secondary groove and one of the center lug grooves,
an inclination angle of the linking groove portions with respect to the tire circumferential direction being from 0 to 5 degrees, and
a ratio D3/LB of a maximum groove depth D3 of the center lug grooves to a maximum width LB of the center blocks in the tire circumferential direction being from 0.1 to 0.3, a maximum groove depth D5 of the linking groove portions being shallower compared to the maximum groove depth D3 of the center lug grooves.

2. The heavy duty pneumatic tire according to claim 1, wherein the lug groove turning portion includes a first groove turning portion on the first side, the first groove turning portion bending or curving so as to protrude towards a third side in the tire circumferential direction, and a second groove turning portion on the second side, the second groove turning portion bending or curving so as to protrude towards a fourth side that is the opposite side to the third side in the tire circumferential direction, a first connection end portion on the first side and a second connection end portion on the second side where the center lug grooves each connects to the circumferential primary grooves, connects to the inward ends of the circumferential primary grooves in the tire width direction, and the second connection end portion of each of the center lug grooves is located on the third side in the tire circumferential direction in relation to the first connection end, and in relation to a center position in the groove width direction of the center lug grooves, an inclination angle, with respect to the tire width direction, of a first straight line connecting between the first connection end and a protruding end at which the first groove turning portion protrudes towards the third side in the tire circumferential direction, and an inclination angle, with respect to the tire width direction, of a second straight line connecting between the second connection end portion and a protruding end at which the second groove turning portion protrudes towards the fourth side in the tire circumferential direction, are greater than an inclination angle, with respect to the tire width direction, of a third straight line connecting between the first connection end portion and the second connection end portion of each of the center lug grooves.

3. The heavy duty pneumatic tire according to claim 2, wherein, in relation to the center position in the groove width direction of the center lug grooves, a portion of each of the center lug grooves disposed between the first connection end and the protruding end where the first groove turning portion protrudes to the third side in the tire circumferential direction is located on the first straight line or towards the third side in relation to the first straight line, and a portion of each of the center lug grooves disposed between the second connection end and the protruding end where the second groove turning portion protrudes to the fourth side in the tire circumferential direction is located on the second straight line or towards the fourth side in relation to the second straight line.

4. The heavy duty pneumatic tire according to claim 1, wherein each of the pair of circumferential primary grooves is provided with a raised bottom portion in which the groove depth is partially shallow.

5. The heavy duty pneumatic tire according to claim 4, wherein a ratio D2/T of a groove depth D2 in the raised bottom portion with respect to a tread width T of a tread portion of the heavy duty pneumatic tire in the tire width direction is less than 0.05.

6. The heavy duty pneumatic tire according to claim 1, wherein a ratio D1/T of a maximum groove depth D1 of the circumferential primary grooves with respect to the tread width T of a tread portion of the heavy duty pneumatic tire in the tire width direction is from 0.03 to 0.09.

7. The heavy duty pneumatic tire according to claim 1, wherein a ratio D5/D3 of the maximum groove depth D5 to the maximum groove depth D3 is from 0.3 to 0.75.

8. The heavy duty pneumatic tire according to claim 1, wherein intermediate groove portions that join the positions of the third groove turning portion and the fourth groove turning portion cross the tire equator line.

9. The heavy duty pneumatic tire according to claim 8, wherein a maximum groove width P6 of the intermediate groove portions is equal to a maximum groove width P5 of the linking groove portions, or greater than the maximum groove width P5.

10. The heavy duty pneumatic tire according to claim 9, wherein a ratio P6/P5 of the maximum groove width P6 to the maximum groove width P5 is from 1 to 2.5.

11. The heavy duty pneumatic tire according to claim 1, wherein two start positions in the tire width direction of each of the circumferential secondary grooves extending respectively from the center lug grooves are mutually shifted in position.

12. The heavy duty pneumatic tire according to claim 11, wherein the two start positions in the tire width direction are located on mutually different sides in the tire width direction, with reference to the tire equator line.

13. The heavy duty pneumatic tire according to claim 1, wherein the center blocks have corners formed in corresponding to primary groove turning portions that turn in convex shapes protruding outward in the tire width direction in the wave-like shaped circumferential primary grooves, and the corners have obtuse angles.

14. The heavy duty pneumatic tire according to claim 1, wherein the groove widths of the pair of circumferential primary grooves and the center lug grooves are all from 7 to 20 mm.

15. The heavy duty pneumatic tire according to claim 1, wherein the heavy duty pneumatic tire is mounted on a construction vehicle or an industrial vehicle.

* * * * *